United States Patent
Kortum et al.

(10) Patent No.: US 7,636,933 B2
(45) Date of Patent: Dec. 22, 2009

(54) HUMAN FACTORS-BASED VIDEO COMPRESSION

(75) Inventors: Philip Ted Kortum, Austin, TX (US); Marc Andrew Sullivan, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1195 days.

(21) Appl. No.: 10/891,845

(22) Filed: Jul. 15, 2004

(65) Prior Publication Data

US 2006/0015924 A1    Jan. 19, 2006

(51) Int. Cl.
*H04N 7/173* (2006.01)
(52) U.S. Cl. ............... 725/87; 725/86; 725/91; 725/92; 725/93; 725/94
(58) Field of Classification Search ............. 725/86–87, 725/91–94
See application file for complete search history.

(56) References Cited

U.S. PATENT DOCUMENTS

2004/0093618 A1* 5/2004 Baldwin et al. ............. 725/101

2006/0271976 A1* 11/2006 Yurt et al. .................... 725/87

OTHER PUBLICATIONS

Yasuhiko Miyazaki, Klara Nahrstedt, Dynamic Coordination of Movies According to Popularity Index and Resource Availability Within a Hierarchical VOD System, 1997 IEEE TENCON—Speech and Image Technologies for Computing and Telecommunications, Dec. 12, 1997, (2 pgs).
Anna Watson, M. Angela Sasse, Measuring Percieved Quality fo Speech and Video in Multimedia Conferencing Applications, ACM International Multimedia Conference, Sep. 12, 1998, (3 pgs).
G. Ghinea, J.P. Thomas, QoS Impact on User Perception and Understanding of Multimedia Video Clips, ACM Multimedia 98—Electronic Proceedings, (4 pgs).
International Search Report for International Application No. PCT/US2005/025341, mailed on Sep. 11, 2005.
Written Opinion of the International Searching Authority for PCT/US2005/025341, mailed on Sep. 11, 2005.

* cited by examiner

*Primary Examiner*—Hunter B. Lonsberry
(74) *Attorney, Agent, or Firm*—Toler Law Group

(57) ABSTRACT

Methods, systems and content have been developed for increasing the bandwidth available to a bandwidth-constrained medium for transmitting digital video content. The content that is to be transmitted is compressed in proportion to the desirability of the content. The desirability of the content is determined by obtaining human-factors data indicative of whether a selected item of content is highly desirable. A desirability score derived from the data is assigned to the content. The desirability score determines the compression level. Feedback systems change the level of compression as the desirability of the content changes with time.

19 Claims, 4 Drawing Sheets

HUMAN FACTORS-BASED VIDEO COMPRESSION

FIELD OF THE INVENTION

This invention relates to optimization of bandwidth-constrained media, and, more particularly to methods and systems to code individual pieces of digital video content for compression based on human behavioral data for transmission of the video content at an optimal rate for a selected medium.

BACKGROUND OF THE INVENTION

Increased digital video traffic puts a premium on conserving bandwidth in a given transmission media. This is especially pertinent for bandwidth constrained transmission media, such as cable and wireless. Bandwidth constraint is a challenge that broadcasters, and other providers of digital video content, must overcome to ensure that the quality of the video product meets the expectations of the viewer. Content providers also confront, with respect to demographics and taste, a segmented, kaleidoscopically dynamic, viewer environment.

The selection of an appropriate video compression level is very important to providers that deliver video content over bandwidth constrained channels such as DSL. The provider wants to minimize the load on the network by choosing the highest compression possible. However, to maximize customer satisfaction with the content, such as a movie, for example, typically means providing less compression to provide a higher quality signal. To strike a balance between compression and viewer satisfaction, it is common practice for content providers to simply choose a single compression level that has been deemed "acceptable" by viewers for a set of test content. The single compression rate is then used for all content.

Technological capabilities now make it possible to modulate the compression of a transmitted signal so that content providers no longer need to be tied to a single compression level for all content. The basis upon which to select compression levels, however, is not a technological problem. It is a data problem. The problem is complex, involving, among other things, the identification of one or more characteristic of a customer that can be exploited to distinguish the customer's satisfaction with a selection of content choices, a methodology to collect data on a selected characteristic, and relating the data automatically to the compression level of the transmitted content.

Accordingly, the present invention makes use of data that demonstrates that customer's perceptions of the sound and video quality of a particular piece of video content is greatly influenced by the desirability of that content. Content that is deemed highly desirable by viewers gets higher video quality ratings than does content that is deemed neutral or undesirable. This means that highly desirable content can be compressed further than less desirable content and still achieve the same overall quality rating by viewers in general.

BRIEF DESCRIPTION OF THE DRAWINGS

The present invention is further described in the detailed description that follows, by reference to the noted drawing, by way of non-limiting examples of embodiments of the present invention, in which like reference numerals represent similar parts throughout several views of the drawings, and in which.

DETAILED DESCRIPTION OF THE INVENTION

Figure 1:
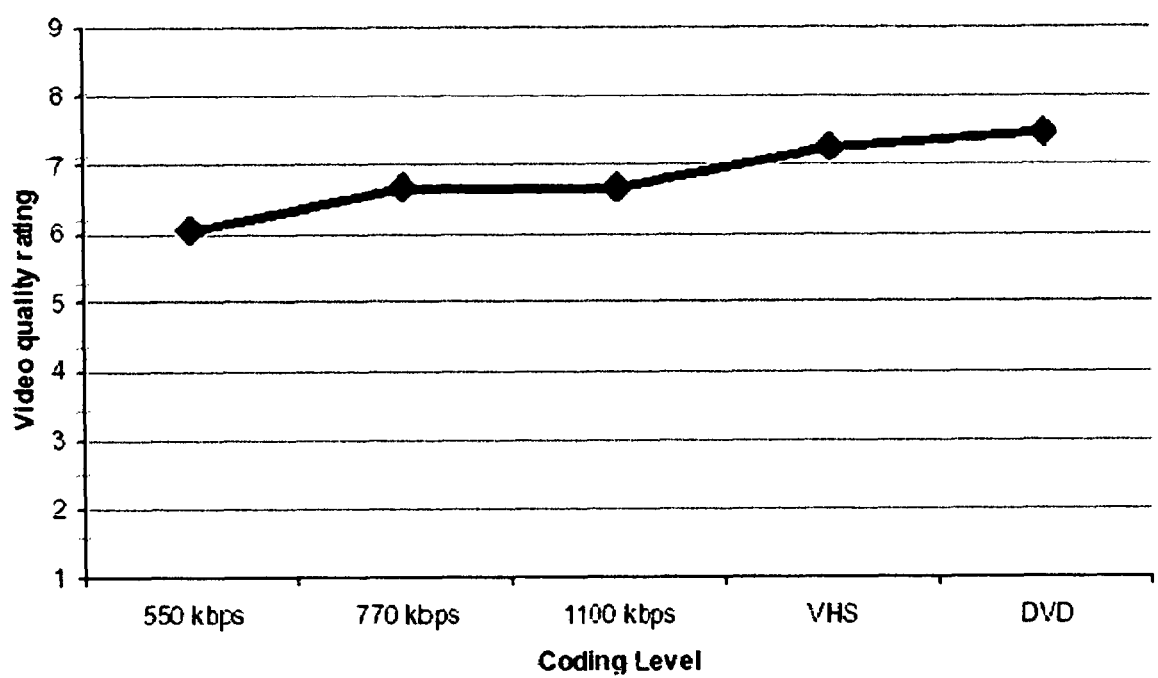
FIG. 1 is a line graph plotting video quality rating data as a function of bandwidth coding.

In view of the foregoing, the present invention, through one or more of its various aspects, embodiments and/or specific features or sub-components, is thus intended to bring out one or more of the advantages that will be evident from the description. The present invention is described with frequent reference to video compression. It is understood, however, that compressing digital video signals is merely an example of a specific embodiment of the present invention, which is directed generically to exploiting human factors data to optimize any automated system, particularly in a self-optimizing feedback system, within the scope of the invention. The terminology, examples, drawings and embodiments, therefore, are not intended to limit the scope of the invention.

Typically, a digital video signal is transmitted through a conduit chain of diverse transmission media each of which may have a different bandwidth. The conduit with the smallest bandwidth, therefore, limits the speed and digital packet size of the transmitted signal. Increasing the density of information by the use of digital compression techniques conserves valuable bandwidth.

The bandwidth of a medium is proportional to the speed at which the signal on the medium can change. A higher frequency signal changes more rapidly than a lower frequency signal. A signal carries a bit stream and the signal may be transmitted as, for example, an electrical signal on a metallic wire or as an electromagnetic radio signal through the air.

A signal is a pulse of bits measured as a function of time, where each pulse represents a symbol. The number of symbols per unit time is the symbol rate. Each symbol is composed of bits. With respect to bandwidth-constrained media, the term "bitrate" is often incorrectly used interchangeably with the term "bandwidth." The bitrate can be increased either by increasing the symbol rate (the number of symbols per second) or by increasing the number of bits per symbol. The latter method improves the spectral efficiency of the medium. Higher spectral efficiency increases the bitrate that can be transmitted by a bandwidth-constrained medium.

Increasing the number of bits per symbol or increasing the symbol rate can increase the bitrate. Increasing the number of bits per symbol does not increase the bandwidth of the given medium. Increasing the symbol rate, however, does increase the bandwidth, because the signal carried by the medium changes more rapidly. The bandwidth of the medium, therefore, is determined by the maximum symbol rate it can transmit.

Radio is an example of a bandwidth-constrained medium in which high spectral efficiency is sought. The radio spectrum is a finite resource that is managed by the government for the public good by, for example, auctioning allocations of the spectrum. The high prices obtained by the auctions are an indication of the great motivation that content providers have to improve the spectral efficiency of the medium.

For many of the analog signal transmission media that are important today, including telephony (wire and wireless) and radio, bandwidth is constrained due to interference. In wireless transmission, many users share the same channel. One user's legitimate transmission on a channel manifests as unwanted interference to another user on that channel. Such interference can be overcome by increasing the transmission power of one signal, but it is self-evident that reciprocated escalating power does not solve the fundamental problem. In wired media, interference manifests as "crosstalk"—the unwanted bleeding of a transmission from one wire to another wire.

An advantage of digital signal transmission is the ability to regenerate a digital signal at points along its transmission. Regeneration allows transmitted digital signals to maintain superior integrity over distance relative to analog transmission. Digital signals, however, put a premium on compression to get the most out of the transmission medium's bandwidth.

Compression systems are collections of compression tools (software) that are assembled together to increase the density of information being transmitted. Among the tools in a compression system is an encoder, which performs the actual information compression, and a decoder, such as a set-top cable box familiar to cable TV subscribers. The combination is referred to as CODEC for coder-decoder.

Modern compression systems for mass media delivery are designed with asymmetric complexity. That is, maximum complexity is loaded into the encoder but minimum complexity is demanded of the decoder because there are millions of decoders and only a few encoders (content providers). Usually the encoder need not be specified, only the decoder. The encoder need merely deliver a decodable signal.

The principles behind video compression include the removal of redundancies (spatial and temporal), and the elimination of irrelevant information, such as information that is not visible to the human visual system (HVS), or information the removal of which is not subjectively noticed by the viewer.

The first video compression tool was interlacing. When interlacing is applied, every other line is omitted in a two-frame cycle. Content of the scene is dropped, with the benefit of halving the bandwidth required by the signal. The process is applied to every picture, no matter what the content. Interlacing is a systematic compression tool.

Interlacing is fine if the picture is static and there is no moving detail. If there is a motion picture, however, the image is blurred.

Adaptive compression systems, in contrast, compress information not systematically but based on content. Adaptive systems change the compression protocol depending on the video content. The process of compression becomes "content adaptive". The compression system intelligently adapts itself to optimally compress the content that is viewed. Compression technology has evolved from the systematic to the adaptive.

Despite the advances in compression systems from systematic to adaptive, the quality of the displayed content must still be evaluated. Traditional objective measurement of television signal quality is performed by measuring physical parameters such as signal amplitude, timing and signal-to-noise ratio. To characterize the linear and non-linear signal distortions from signal transmission and processing, specially designed static test signals are inserted into the video and analyzed at reception. The advantage of using static test signals is that they yield numerical values that have been correlated with subjective picture quality. The standard test signals and measurement procedures are defined in the standards such as NTC-7 and EIA RS-250.

The introduction of digital signal processing into television revealed that some of the traditional analog test signals were unable to accurately predict the signal distortions. New test waveforms were developed specifically to characterize digital video signals. For example, to explore quantization noise, a ramp signal is used instead of the staircase signal to measure the non-linear distortions. The situation is even more complex with the use of digital video compression where picture quality impairments are dependent on picture content. Traditional methods for signal quality measurement are unable to measure the perceptual picture quality; they can only measure the analog front and back ends of the system.

Perceptual coding exploits the properties of the HVS. It has been employed in various video compression standards, including MPEG-2. Typically, this is done in the video pre-processing and quantization stages. In pre-processing, the source signal is filtered and sampled to reduce the information that is not visible to the HVS. This includes chroma conversion, chroma subsampling, and signal transformation.

The use of digital video compression has a direct impact on objective signal quality measurement. Waveform measurements using the static test-signals fail with compressed video. First, the objective of designing a compression algorithm is not to replicate the original signal waveform as closely as possible, but to yield a perceptually equivalent approximation of the picture. Secondly, because of the constraint of bandwidth, the resulting compressed picture quality is highly content dependent. In other words, stressful source material (in terms of spatial detail and motion) produces more visible artifacts and degraded subjective picture quality.

Subjective picture quality is not a linear function of compression ratio or bit rate. Furthermore, unique digital transmission artifacts such as blocking, error strips and freeze frames make assessment of picture quality more difficult for digital systems than for analog systems. The time-varying nature of the impairments further complicates quality assessment of digital systems. Digital artifacts may be short-lived and the quality of a digital transmission may fluctuate more than that of an analog transmission.

It is well known that the quality of the output image from a CODEC is significantly influenced by the criticality of the video sequence. Thus, the selection of appropriate image sequences is an important process.

Generally, non-expert viewers are used to evaluate image quality. Non-expert viewers are people who have no prior professional or extensive personal experience in dealing with video display systems or devices.

For video quality assessment there is another high-level process that sits on top of the HVS. This is the process that a human uses to make a quality judgment. For example, the HVS might be able to detect an impairment but the human judgment might not consider it significant enough to influence the quality decision. The present invention exploits this peculiarity of human nature by using human factors data regarding the desirability of video content to select a level of digital compression that optimizes the bandwidth available in a constrained transmission medium. An exemplary method for collecting and evaluating relevant human factors data is described below. The example is drawn from a manuscript by the inventors entitled "Content Is King: The Effect of Content on the Perception of Video Quality," by Philip Kortum and Marc Sullivan, 2004.

EXAMPLE

1. Method

Participants 40 participants were selected for participation in the trial. Half of the participants were female, and the other half were male. A broad age spectrum was recruited, with 34% of the participants in the 18-29 age bracket, 33% in the 30-50 age bracket and 33% in the 50+ age bracket. All of the participants had self-reported normal or corrected-to-normal vision and hearing. All of the participants were people who regularly rented movies (defined as 2 or more rentals/month on average).

Apparatus and Stimuli

Movie Clips from 20 different movies (all major studio releases) were randomly selected for viewing. Only movies that were available in non-letterbox (4:3 aspect ratio) on DVD were used. The decision to use only non-letterbox content was driven by the strong customer reactions (both positive and negative) to the letterbox format. Each of the clips was 2 minutes in duration. Ten of the clips contained high action/movement scenes and ten contained low action, more easily encoded scenes. Each clip was encoded at the three rates (490 kbps, 771 kbps & 1100 kbps). VHS and DVD versions of the same 20 clips were also used. The tapes and DVDs were obtained through standard retail outlets and presented to the viewers in their native format (i.e. no additional coding/decoding was used). Including the 3 encoding levels, the VHS, and the DVD samples, there were a total of 100 video samples used in the study.

A late model 32" direct view television with built-in stereo sound capabilities was used to present the movie clips. Factory default calibration settings were used for all of the television's video display parameters. A dedicated video set top box was used to deliver the streamed encoded content, while the VHS and DVD samples were delivered using consumer grade VCR and DVD players. The video source was selected for each video using a professional grade video mixer.

Participants were seated in a couch 11 feet away from the television. The room was illuminated at approximately 3 ft-candles to insure minimum reflections and glare off of the television screen.

Procedure

Following the signing of an informed consent, participants were given the following instructions:

"Today we would like for you to try out a new way of renting videos. Instead of going to the store and renting a movie you will be able to rent a movie through your television over DSL and start watching it immediately. This type of service is called a "Movie on Demand Service" because you can select and immediately watch any of a wide range of major studio movies. We're interested in what types of movies you are interested in, how you categorize movies, the quality of the acting, if you would rent certain movies, and the picture and sound quality of the movie. We will show you a series of clips from various movies. After each clip you will have 6 questions to answer about the movie. Do you have any questions before we begin?"

Before actual test began, participants were introduced to the task by viewing and rating two practice clips. One clip was a 490 kbps from "Proof of Life." (the lowest encoding level) The other test clip was in DVD format from "Top Gun." (the highest encoding level). After each practice clip the customer filled out a questionnaire with the experimenter present to answer any questions the participant might have about the procedure.

Following the practice clips, each participant viewed 20 different movie clips, rating each clip immediately after its presentation. Each participant saw each clip only once and the level at which that clip was encoded was selected from a counter balanced list. The viewing order of the clips was completely randomized between subjects.

Participants were asked the following questions after they viewed each clip:
1) What category is this film? Action, Drama, Comedy, Suspense, Horror, Family, Sci-Fi
2) What parental rating would you assign this film? G, PG, PG-13, R
3) How would you rate the quality of the acting in the film? Excellent, Good, Only Fair, Poor, Terrible
4) Do you know anything about the movie? (circle all that apply) No, Read reviews, Talked to someone about it, Have seen it before
5) I would like to see this movie. Strongly agree, Substantially agree, Slightly agree, Slightly disagree, Substantially disagree, Strongly disagree
6) How would you rate the overall quality of the sound and picture for this movie?
Excellent, Very good, Good, Somewhat good, Fair, Somewhat poor, Poor, Very poor, Bad Questions 1-4 were designed as distracter questions to help insure that the participant was not focusing solely on video picture and sound quality, but rather was making an overall evaluation of the film clip.

2. Results

FIG. 1 is a line graph plotting video quality rating data as a function of bandwidth coding. A 5×3 repeated measures ANOVA was conducted to determine the effects of coding level and desire to view the movie on customer's perception of video quality. Desire to view a movie was collapsed into 3 bins (don't want to see, neutral, want to see) for the purposes of this analysis. As expected, there was a main effect for coding level $F(4, 155.7)=16.14$, $p<0.0001$, with an increase in quality rating as coding bandwidth increases. A post-hoc test revealed 550 kbps differed from 770 kbps, VHS and DVD and that 770 kbps and 1100 kbps differed from VHS and DVD. There was no detectable difference between 770 kbps and 1100 kbps, nor was there a difference between VHS and DVD.

Figure 2:
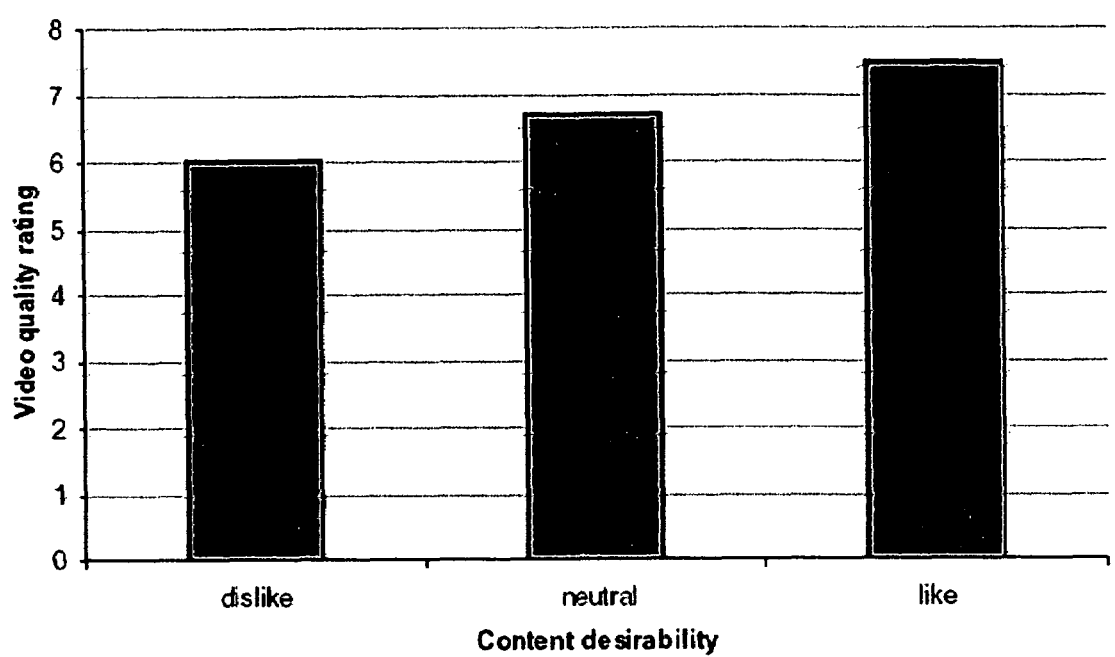
FIG. 2 is a bar graph of average quality rating data as a function of content desirability data.

FIG. 2 is a bar graph of average quality rating data as a function of content desirability data. The data reveal that there was a significant effect for desire to see the movie: $F(2, 250.4)=30.19$, $p<0.0001$. The quality rating rose as the desire to see the movie increased. A post-hoc analysis revealed that video quality rating differed significantly at all 3 levels of content desirability.

The data supports the conclusion that the desirability of the content plays a significant role in a viewer's subsequent rating of the video quality of that content. Desirable content was, on average, rated 24% higher than undesirable content and 11% higher than desire-neutral content. The differences are large enough to suggest that using the 'wrong' content in an evaluation of a compression scheme could cause a severe over-orunder estimation of the actual video quality. The conclusion is significant because subjective video quality measurements have not typically taken the content into account (aside from level of coding difficulty).

In the experiment the viewing duration was lengthened to 2 minutes (from the 10-15 second ITU recommendation) to allow the user to become sufficiently involved in the story. Further, content was selected from widely viewed, commercially available movies. Both of these experimental design elements would have allowed the viewer an opportunity to become more engaged with the content.

The first study, described above, identified the existence of a content effect. One potential concern about the results is the possibility that they are specific to the subset of content used for the study. To address this concern, a second study was conducted using completely different content. In the second study, participants were able to select 10 movies clips from a list of 40. As before, the content was selected from major studio released movies.

Figure 3:
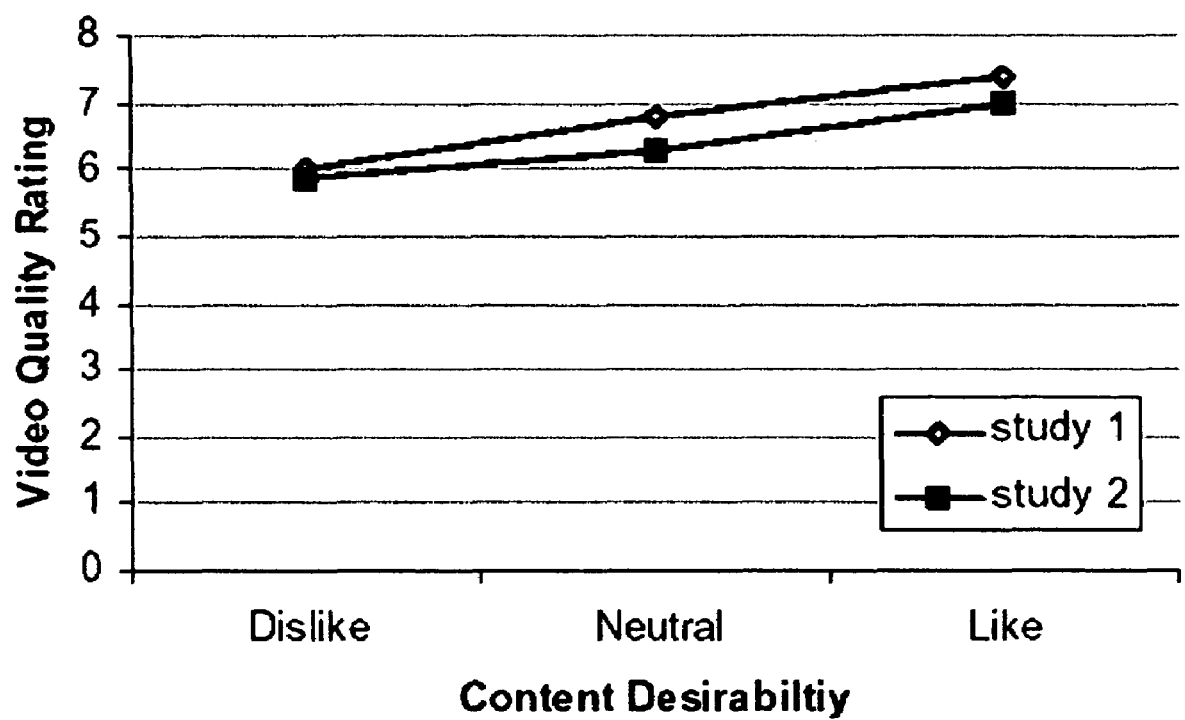
FIG. 3 is a line graph of quality rating data as a function of content desirability data for a first study (open diamonds) and a second study (solid squares).

FIG. 3 is a line graph of quality rating data as a function of content desirability data for the first study (open diamonds) and the second study (solid squares). As shown in FIG. 3, the relationship between the sound/video quality and the desirability of the content was similar to the results from the first study.

A viewer's preference for the content of the video presented has a significant effect on the user's ratings of the quality of the video display. Using content that is reflective of the actual end content, rather than 'test' content, produces more accurate ratings of viewer satisfaction. Additionally, in accordance with the present invention, viewer preference bias can be incorporated into content compression coding, as illustrated in FIG. 4.

Figure 4:
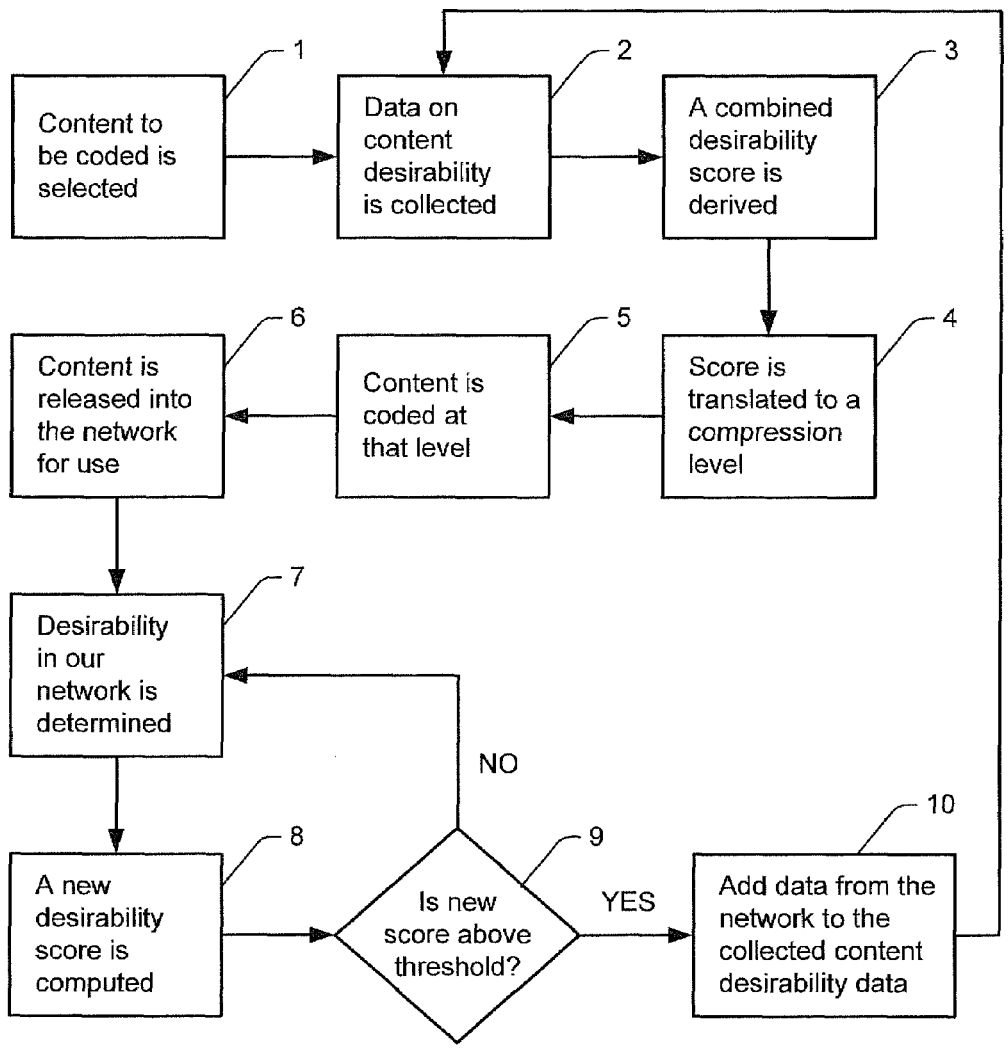
FIG. 4 is a flow chart of a human factors-based content compression system for one embodiment of the present invention.

FIG. 4 is a flow chart of a human factors-based content compression system for one embodiment of the present invention. At step 1, the content that needs to be encoded is selected. At Step 2, data concerning the desirability of the content is collected. The present invention contemplates collecting data from one or more sources, including but not limited to: Nielson® ratings; retail video sales figures; office figures; awards; award nominations; production personnel popularity (such as the actors or director); content production budgets; content marketing budgets; advertising expenditures; content distribution channels; content market penetration; repeat content viewing; focus group results; the number of good versus bad reviews; pay-per-view purchases; target demographic marketing data, the number of first release screens nationwide, and so forth.

Data from all of the sources is computed a single, or combined, "desirability score" at step 3. The desirability score is translated into a compression level at step 4: the higher the desirability, the higher the compression that is used (up to a specified maximum level). Step 5 includes automatically coding the content, and the content is released into the network at step 6 for viewing by consumers.

The process of scoring and coding is refined with a feedback loop. For example, at step 7, data is collected on how popular the content is on a selected network and a new score is computed at step 8. The new score determines whether the desirability rating needs to be adjusted based on a cost/benefit threshold setting (the cost of re-coding the content vs. the benefit gained from lower network utilization). If the desirability rating does not need to be adjusted at step 9, the popularity in the network continues to be monitored and checked against the threshold measure by returning to step 7. If the new rating does pass the threshold test, at step 9, then, at step 10, data from the network is added to the collected content desirability data, at step 2. A new combined desirability score is computed at step 3, and the content is re-coded and released.

The system of the present invention has several significant advantages over the current "single compression" methods:
1) The demands on the video delivery network are automatically minimized because highly desirable content (the most watched) is compressed at higher levels than content that is infrequently watched;
2) The compression rate is constantly (and automatically) reviewed for adjustment to insure the optimal compression rate is always being used; and
3) The overall experience for the viewers will remain constant because the desirability/compression score combinations are based on human behavioral data.

The present invention contemplates methods, systems and content that increase the bandwidth available to a bandwidth-constrained medium for transmitting digital video content. The content that is to be transmitted is compressed in proportion to the desirability of the content. The desirability of the Content is determined by obtaining human-factors data indicative of whether a selected item of content is highly desirable. A desirability score derived from the data is assigned to the content. The desirability score determines the compression level. Feedback systems change the level of compression as the desirability of the content changes with time.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A system to increase bandwidth available to a bandwidth-constrained medium for transmission of digital video content, the system comprising:
   one or more digital video compression tools to compress the digital video content according to a compression code that specifies a level of compression for the digital video content; and
   a video content-desirability scorer to provide a desirability score based on the level of compression of the digital video content, wherein a greater amount of compression results in a greater desirability score, and wherein the video content-desirability scorer is further to generate the compression code from the desirability score, and to provide the generated compression code to the one or more digital video compression tools.

2. The system of claim 1, wherein the medium comprises a broadcast medium.

3. The system of claim 1, wherein the medium comprises coaxial cable.

4. The system of claim 1, wherein the medium comprises an optical medium.

5. The system of claim 1, wherein the medium comprises a conventional telephone line.

6. The system of claim 1, wherein the medium comprises DSL.

7. The system of claim 1, further comprising a codec.

8. The system of claim 1, further comprising a source of digital video content transmission.

9. The system of claim 1, further comprising a desirability score feedback loop to dynamically refine the compression code based on desirability scores that vary over time.

10. The system of claim 1, wherein the scorer further comprises one or more processors to accept desirability data input, calculate a desirability score from the input data and output to the compression tools a compression code derived from the score.

11. The system of claim 10, wherein the input data comprises one or more data sets selected from the group: viewer ratings; retail video sales figures; wholesale video sales figures; video rental volume; theatrical release box office figures; awards; award nominations; production personnel popularity (such as the actors or director); content production budgets; content marketing budgets; advertising expenditures; content distribution channels; content market penetration; repeat content viewing; focus group results; the number of good versus bad reviews; pay-per-view purchases; target demographic marketing data, and the number of first release screens nationwide.

12. The system of claim 1, wherein the content transmission supports high definition television display.

13. The system of claim 1, wherein the content transmission supports one or more MPEG-standards display.

14. A method for increasing the bandwidth available to a bandwidth-constrained medium for the transmission of digital video content, the method comprising:
   scoring a desirability of the digital video content to obtain a desirability scores, wherein a greater compression of the digital video content results in a higher desirability score;
   deriving a compression code from the desirability score, wherein the compression code specifies a level of compression of the digital video content; and
   compressing the digital video content according to the compression code.

15. The method of claim 14, further comprising repeating the steps to change the compression of the content as the desirability of the content varies with time.

16. The method of claim 14, further comprises obtaining desirability data.

17. The method of claim 16, further comprising repeating the steps to change the compression of the content as the desirability of the content varies with time.

18. A system to increase the bandwidth available to a bandwidth-constrained medium for the transmission of digital video content, the system comprising:
   a source of digital video content;
   one or more digital video compression tools to compress the digital video content;
   a video content-desirability scorer to accept desirability data, to derive a desirability score from the desirability data, to assign a compression code to the digital video content based on the desirability scores, and to provide the compression code to the video compression tools, such that the digital video content is compressed in proportion to its desirability, wherein a greater amount of compression of the digital video content results in a higher desirability score, and
   a desirability score feedback loop to change the compression of the digital video content as the desirability of the content varies with time.

19. A method of compressing digital content for release into a network, the method comprising:
   selecting content to be coded;
   collecting data on content desirability;
   deriving a combined desirability score;
   translating the combined desirability score into a compression level;
   coding the content at the compression level;
   releasing the content into the network for use;
   determining the desirability of the content in the network;
   computing a new desirability score;
   setting a threshold score;
   determining whether the new score is above the threshold; and
   adding network data to the data used for deriving the combined desirability score for new scores above the threshold.

* * * * *